United States Patent [19]

Foster-Pegg

[11] 4,099,374
[45] Jul. 11, 1978

[54] GASIFIER-COMBINED CYCLE PLANT

[75] Inventor: Richard W. Foster-Pegg, Media, Pa.

[73] Assignee: Westinghouse Electric Corp., Pittsburgh, Pa.

[21] Appl. No.: 677,194

[22] Filed: Apr. 15, 1976

[51] Int. Cl.² ............................................. F02B 43/08
[52] U.S. Cl. ............................... 60/39.12; 60/39.18 B
[58] Field of Search ............ 60/39.03, 39.12, 39.18 B, 60/39.27; 290/40 A, 40 B; 73/23; 48/212, 211

[56] References Cited
U.S. PATENT DOCUMENTS

| | | | |
|---|---|---|---|
| 2,225,311 | 12/1940 | Lyshalm | 60/39.03 |
| 2,592,749 | 4/1952 | Sedille et al. | 60/39.12 |
| 2,675,672 | 4/1954 | Sohorner | 60/39.12 |
| 3,741,676 | 6/1973 | Silvern et al. | 475/52 |
| 3,804,606 | 4/1974 | Archer et al. | 60/39.12 |
| 3,868,817 | 3/1975 | Marion et al. | 60/39.02 |

Primary Examiner—Louis J. Casaregola
Attorney, Agent, or Firm—E. F. Possessky

[57] ABSTRACT

A gas turbine set, a heat recovery boiler and a steam turbine are operated in a combined cycle to generate electric power. A gasifier generates fuel gas for the gas turbine from a reaction of fuel and compressed air supplied from the gas turbine. The booster compression process is regenerative, i.e. the air is cooled by the booster outlet air before entry to the booster and the booster outlet air is reheated by the booster inlet air prior to passage to the gasifier. Generated fuel gas is controllably heated by a heater using hot water from the heat recovery boiler. Gasifier process control is provided by a fuel ratio controller which varies the gasifier inlet fuel flow as gasifier inlet air flow varies with plant load changes.

5 Claims, 4 Drawing Figures

GASIFIER-COMBINED CYCLE PLANT

BACKGROUND OF THE INVENTION

The present invention relates to electric power plants and more particularly to improved gasifier-combined cycle plants.

In a gasifier-combined cycle power plant, a gasifier processes fossil fuel such as pulverized coal or oil to generate a fuel gas for use in operating one or more gas turbine sets. In turn, the gas turbine exhaust is directed through heat recovery steam generator means to produce steam for operating a steam turbine. Electric generators are driven by the turbines to produce the plant power output.

The gasification process includes a cleanup step which enables the plant to satisfy environmental restrictions on atomspheric discharge. The enengy exchanges which occur throughout the plant processes generally enable the plant efficiency to be relatively high, especially for intermediate plant duty. An example of a prior art plant of the type described is set forth in a paper entitled PACE-SGP Oil Gasification Combined Cycle For Power Generation and presented to the American Power Conference in Chicago in April, 1974. Another prior art article entitled Recent Experimental Results on Gasification Combustion of Low BTU Gas for Gas Turbines and published in *Combustion* in April 1974 describes a plant in which an alternative gasification process is used. Various prior art U.S. patents relate to this subject matter area including Schorner No. 2,675,672, Marion No. 3,866,411, Archer No. 3,804,606, Rudolph No. 3,765,167, Blaskowski No. 3,849,662 and Krieb No. 3,704,587. At pages 16 and 17 of the May 1973 issue of *Gas Turbine World* there is also disclosed a gasification combined cycle system.

There has generally existed a need to improve the manner in which the gasifier and the combined cycle are integrated to function as a unitary power plant. Specifically, there has existed a need to improve the way in which air is supplied to the gasifier system from the gas turbine apparatus, the way in which generated fuel gas is processed for use in the gas turbine apparatus, and the way in which stable operation is provided for the gasifier system as plant laod changes are made. The present invention is directed to these areas of improvement. No representation is made that the prior art cited herein is the best prior art nor that the interpretations placed on it are not rebuttable.

SUMMARY OF THE INVENTION

A gasification combined cycle plant includes gas turbine set means which supplies compressed air to a gasifier system and hot exhaust air to heat recovery steam generator means where steam is produced for operating a steam turbine. The gasifier system combines input fuel oil with the input air which flows from the gas turbine to the gasifier through a booster compressor in a regenerative cooling/heating loop. Means are provided for heating the fuel gas with low temperature HRSG water after the fuel gas has been cooled for cleanup. Means are provided for controlling the gasifier fuel input flow as a function of the gasifier air flow so that the gasifier air flow freely achieves equilibrium through process interactions which result from plant load changes.

BRIEF DESCRIPTION OF THE DRAWINGS

FIG. 4 shows a schematic diagram of a control system for the plant of FIG. 2.

DESCRIPTION OF THE PREFERRED EMBODIMENT

Figure 1:
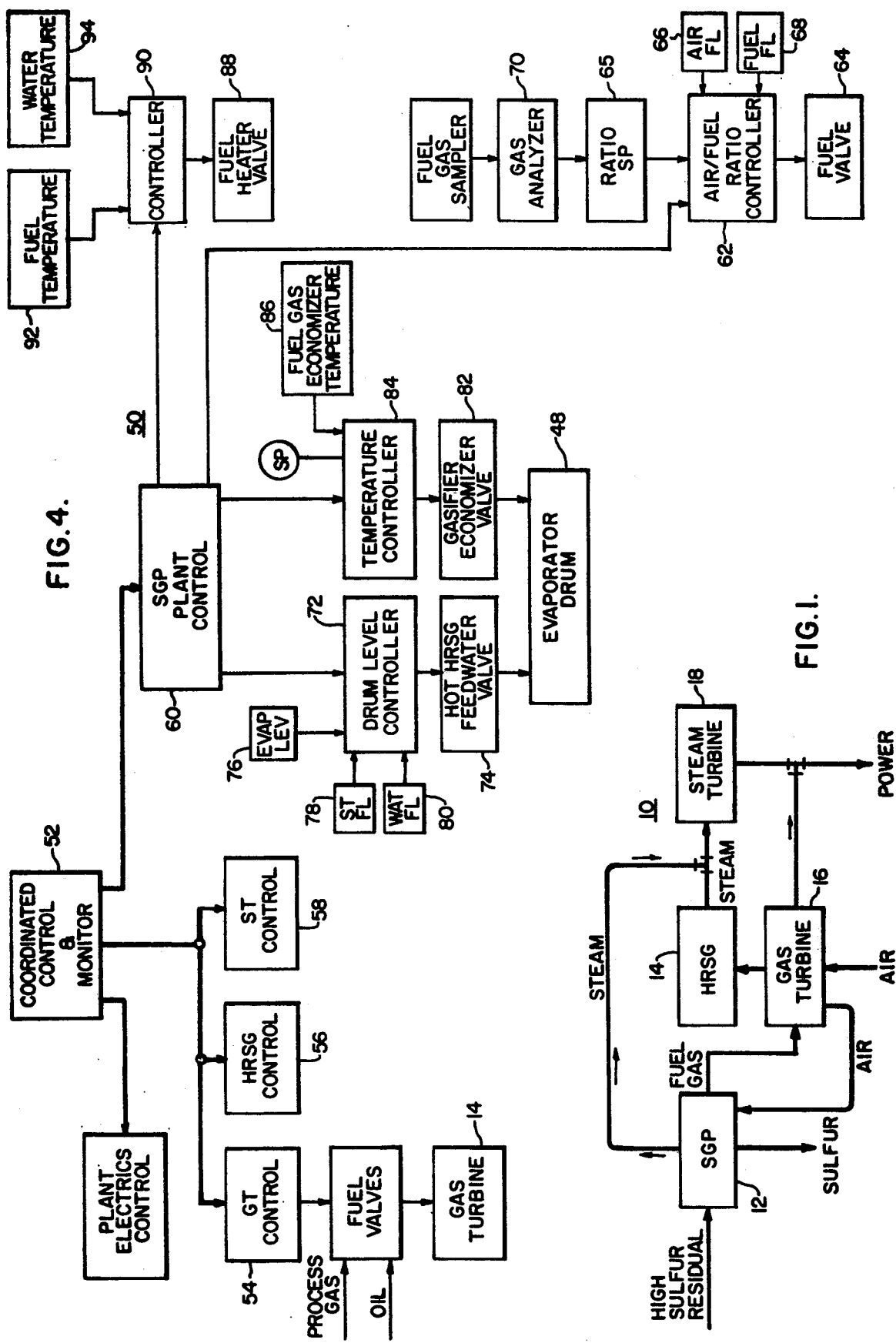
FIG. 1 shows a basic block diagram of a gasifier-combined cycle plant in which the invention can be embodied.

More particularly, there is shown schematically in FIG. 1 a combined cycle power plant 10 which employs a gasification system 12, i.e. a Shell Oil Gasification Process (SGP), to produce gaseous fuel for the plant. Coal or other gasification systems can also be used in implementing the invention. A gas turbine set 14 burns the fuel and generates heated exhaust gas which supplies heat to a heat recovery steam generator (HRSG) 16. Steam from the HRSG 16 and the gasifier system 12 drives a steam turbine 18. Generators driven by the two turbines produce electric power.

In this case, the plant 10 has a power output of 160 MW and a heat rate of 9760 BTU/KW-HR. Air from the gas turbine compressor discharge is sent to the gasification system 12 where it is used to burn a portion of a heavy oil fuel input and to gasify the remainder. The hot fuel gas is cooled in a waste heat boiler to allow cleanup and sulfur removal. The low-BTU fuel gas (115 BTU/SCF) is then sent to the gas turbine 14 for burning in the turbine combustors. The steam generated in the HRSG 16 is superheated before it is sent to the steam turbine. The gasification-combined cycle plant 10 utilizes in this case three gasification reactors; a residual oil feedrate of about 6,000 barrels per day produces the required clean fuel gas and high pressure steam. Generally, any liquid fuel can be used including high sulfur content fuel without exceeding environmental restrictions. Higher sulfur content fuels are usually the lower cost, more available fuels. Even refinery residual or bottom-of-the-barrel fuels can be used. Thermal rejection for the plant 10 is provided by cooling towers.

The plant 10 is suited for base or intermediate duty. When operating in the intermediate mode the plant 10 can move from the hot standby condition to full load in 75 minutes after initiation of the starting sequence. The gasification plant is capable of following the fuel requirements for start and stop operation in intermediate duty.

In the plant 10, 5% sulfur content fuel is employed with a cleanup system which removes sulfur to an equivalent fuel content of 0.3%. An increase in fuel sulfur content and/or the provision for cleanup to lower sulfur emission levels can be accommodated with only a slight increase in plant cost.

CYCLE DESCRIPTION

Figure 2:
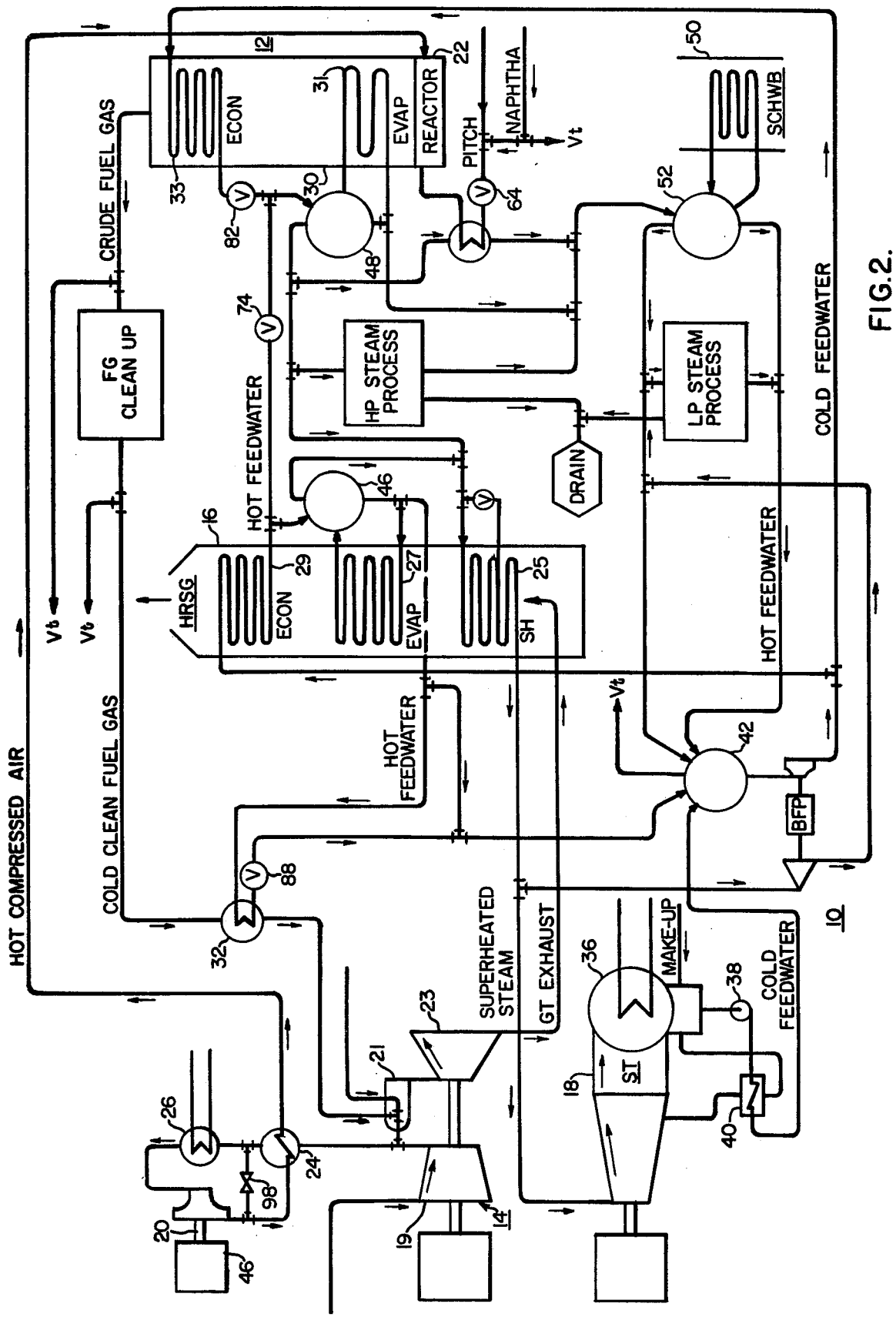
FIG. 2 shows a more detailed diagram of the plant shown in FIG. 1 and operated in accordance with the principles of the invention.

As shown in FIG. 2, ambient air enters the gas turbine compressor 19 and is compressed to about 12 atmospheres. At this point approximately 20% of the compressor discharge is sent to the gasification system 12 and returns as part of the low-BTU fuel gas supplied to the turbine combustors from the gasifier. The remaining 80% of compressor discharge enters the gas turbine combustor section 21 where it is used to burn the low-BTU fuel gas and is heated to a temperature of about 2000° F. The hot compressed gases are then expanded through the turbine section 23 and exhausted through the HRSG 16 to produce steam.

In the HRSG 16, the exhaust gas passes through a superheater 25, an evaporator 27 and an economizer 29. The flow from the gas turbine set 14 to the gasifier is first cooled. The air is then further compressed in a steam driven booster compressor 20 to about 25 atmospheres which is sufficient to overcome the remaining system losses. The booster compressor discharge is heated before entering a reactor 22 in the gasifier system 12.

The compressed air flow to the gasifier 12 leaves the turbine compressor 19 at 667° F and enters a heat exchanger 24 and is cooled to 340° F. The cooling medium in the exchanger 24 is the same compressed air stream which, after being cooled by an externally cooled heat exchanger 26 to 120° F and being compressed by the booster compressor 20, is reheated to 600° F in the exchanger 24 on its way to the gasification plant 12. In this way, the compressed air from the turbine compressor 19 is cooled to a reduced temperature which allows the economic use of a smaller booster compressor 20 to achieve further air compression as needed for use of the air in the gasifier 12, yet the cooling is achieved efficiently from a cycle standpoint because a substantial part of the heat generated on cooling the compressor air which flows to the booster 20 is used to reheat the compressed air on its passage from the booster 20 to the gasifier 12.

The hot compressed air is discharged to the gasifier 12 where it reacts with preheated fuel oil, which is partially oxidized and converted to low-BTU gas. The hot low-BTU gas is passed through a waste heat boiler 30 where it supplies heat to an evaporator coil 31 and an economizer coil 33. It is desulfurized and otherwise cleaned and discharged to a fuel gas heater 32 where it is heated by feedwater before use in the gas turbine 14.

Figure 3:
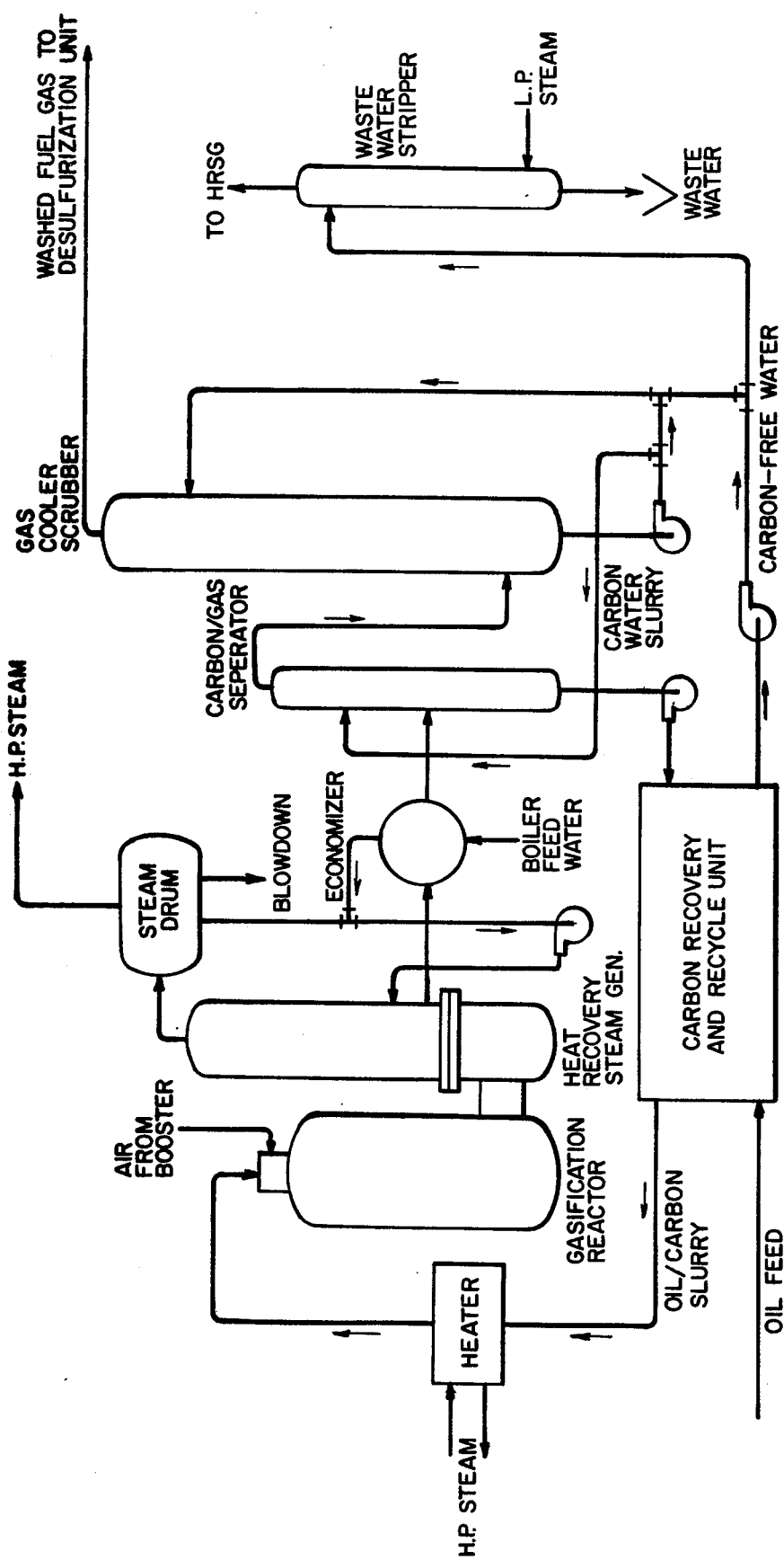
FIG. 3 shows a diagram of a fuel oil gasifier system employed in the plant of FIGS. 1 and 2.

Preheated petroleum fuel which has been pumped from storage is introduced into the gasifier 12. In the top region of the partial oxidation reactor 22, the fuel and air are mixed by a nozzle assembly. Partial combustion occurs at 2400° F consuming about 30% of the fuel heating value to convert 95 to 98% of the liquid fuel into the gaseous phase. About 3 to 5% by weight of the fuel is converted into a solid phase consisting of unreacted carbon and ash from the petroleum. A gasifier flow diagram is shown in FIG. 3.

The gas continuously produced in non-catalytic, partial combustion in the reactor 22 has the following typical properties:

| (Fuel Gas Properties (Percent by Volume) | |
|---|---|
| Hydrogen | 15.0 |
| Carbon Monoxide | 22.5 |
| Carbon Dioxide | 1.9 |
| Methane | 0.2 |
| Nitrogen | 60.4 |
| | 100.0 |
| Lower Heating Value (BTU/SCF) | 115.0 |

The hot product gases from the reactor 22 pass into waste heat boiler 30 where the gases inside the tubes are cooled from 2400° F to about 600° F while high pressure saturated steam is raised on the outside of the tubes.

The cooled gases are further cooled passing through the economizer 33 where boiler feedwater is preheated.

Through the combustion of the SGP waste heat boiler and the economizer 33, about 80% of the heat released by the partial combustion is recovered as high pressure steam. A small fraction of this high pressure steam is used for preheating feed streams in the gasification unit with the major portion of the steam exported to the gas turbine heat recovery steam generator 16.

The cooled gases from the economizer 33 are intensely washed with water to remove most of the soot and ash. The washed gases, nearly particulate-free, are separated from the soot slurry and passed to a final scrubbing column where the soot and ash in the fuel gas are reduced to less than 5 ppm. some cooling of the gases occurs in this final wash step.

Nearly all of the trace quantities of ammonia and hydrogen cyanide are scrubbed from the gas by the two-step water washing. These gases are stripped nearly completely from the water in the subsequent processing and are incinerated.

The soot slurry containing the soot and ash recovered during the water wash steps is sent to the carbon recovery and recycle unit. In this unit, the soot slurry is contacted with some petroleum fuel such that the soot is transferred from the water and dispersed in the liquid fuel to be fed to the SGP reactor. The net effect of this process is that the soot which is unavoidably produced by the partial combustion is recycled to the SGP reactor where it burns. Under these soot recycle conditions, there is no net production of soot from the gasification of the fuel.

Ash in the fuel to the SGP unit is distributed between two points. About 45% of the ash is deposited as a slag in the bottom of the gasification reactors. This ash slag is a friable solid which is easily removed by shoveling it from the reactor bottom when the power plant is shut down for steam generator inspections. The remaining 55% of the ash appears as soluble metal oxides in the waste water from the process. Depending on local restrictions, treatment of the water for these metals may be required.

The particulate-free fuel gas from the SGP unit next passes to a Sulfinol unit where the sulfur is removed from the fuel gas to the desired level. Stripped sulfur-laden gases from the Sulfinol unit are converted to elemental sulfur using the commercially proven Claus and SCOT processes. The desulfurized fuel gas flowing from the Sulfinol process is preheated before entering the gas turbine combustors 21.

The steam turbine 18 receives superheated steam from the HRSG superheater 25 and exhausts to a condenser 36. Condensate pumps 38 pump the total flow through a feedwater heater 40 and into a deaerating heater 42. Other inputs into the deaerating heater 42 are feedwater from the fuel gas preheater 32, steam from the boiler feedwater pump turbine drive 44 and feedwater from the process.

The turbine driven boiler feed pump 44 pumps water from the deaerating heater 42 to the HRSG economizer 29 and the waste heat boiler economizer 33. The water from the HRSG economizer 33 is divided into two paths; one goes to the HRSG evaporator drum 46 and the other goes to the waste heat boiler evaporator drum 48.

From the HRSG evaporator, part of the hot feedwater is sent to the fuel gas preheater 32 and the steam is sent to the HRSG superheater 25. In this way, the fuel gas generated by the gasifier 12 is preheated on its way to the gas turbine combustors 21, and the heat used for this purpose is surplus heat obtained from the low temperature end of the HRSG 16 rather than more valuable high temperature heat.

An additional steam flow from the gasifier boiler evaporator drum 48 is also sent to the HRSG superheater 25. A total flow of superheated steam is then available from the HRSG 16 to drive the steam turbine 18. Water from the gasifier economizer 33 combines with the flow from the HRSG economizer 16 to supply the evaporator drum 48. From the drum 48, part of the steam is used in the process plant and another part of the steam is provided to the HRSG superheater 25.

Heat from Scot and Claus processes generates steam in Scot and Claus waste heat boilers 50. Feedwater from the drum 52 combines with additional feedwater from the process plant and is supplied to the deaerating heater 42. Flow is also provided to the Scot and Claus drum 52 from higher pressure process plant levels. Steam from the drum 52 combines with steam from the BFP turbine drive exhaust and is supplied to the process plant.

CONTROL AND OPERATION

As shown in FIG. 4, a control system 50 is provided for integrated operation of the plant 10. The control includes a coordination control 52 and respective controls 54, 56 and 58 for the gas turbine 14, the HRSG 16 and the steam turbine 18. Generally, the controls 52, 54, 56 and 58 are like the corresponding combined cycle plant controls disclosed in copending application Ser. No. 495,765 assigned to the present assignee.

As such, a computer can be used for the coordinated control 52 and for various parts of the controls. However, the coordinated control is slightly modified to coordinate the operation of the gasifier 12 through an SGP control 60 into the plant operation especially during startup, shutdown and transients. For example, the gas turbine is started on distillate fuel, no air is allowed to flow from the gas turbine set 14 to the gasifier 12 until the gas turbine 14 is up to speed, and fuel gas is vented until the gas generation rate is sufficient to allow bumpless transfer from distillate operation to fuel gas operation of the gas turbine 14. As another example, steam from the waste heat boiler or gasifier drum 48 is shunted to the condenser until adequate steam temperature is realized to send it to the steam turbine 18. An air flow limiter prevents excessive not output of air from the gas turbine during transients, and a check valve is operated to prevent back flow from the gasifier into the gas turbine in transients.

Once the plant 10 reaches load operation, the plant process is essentially self-coordinating and no external coordinating control need be imposed over the gasifier 12 and the gas turbine set 14. Generally, the gas turbine fuel flow is controlled to satisfy a load demand from the coordinating control during automatic operation. The gas turbine load demand is characterized to set a fuel flow which results in a total steam and gas turbine generator electrical output which equals a specified plant electrical output.

Changes in plant load cause fuel flow changes which in turn cause corresponding pressure changes back through the gasifier 12 to the booster compressor 20. For example, a load reduction results in an increase in process pressures and an increase in the pressure ratio across the compressor 20 thus causing a corresponding drop in booster compressor air flow. In turn, oil flow to the gasifier 12 is controlled to a lower level to hold a setpoint weight flow ratio with the reduced air flow level. In contrast, the prior art typically depends on complicating coordinating controls to achieve process balance on load changes, i.e. on sensed gas turbine fuel flow changes the gasifier oil flow is controllably reduced and the air flow cut back to keep a setpoint ratio with the gasifier oil flow.

In all cases, proper air/fuel ratio is critical to plant operation since an oxygen deficiency is required for fuel gas generation and since excessive oxygen could result in oxidation of accumulated fuel gas and a possible explosion in the gasifier 12. As already indicated it is preferred in this case that the gasifier air flow be allowed to find its own equlibrium as plant load changes occur, and air/fuel ratio control is achieved by air follow control of the gasifier oil flow. Therefore, a ratio controller 62 operates a fuel valve 64 to hold a setpoint 65 for the air/fuel ratio in response to measured air and oil flows from sensors 66 and 68. The ratio setpoint is generated by a gas analyzer 70 which analyzes gas samples for heating value and/or chemical analysis and trims the ratio setpoint to maintain a desired heating value for the generated fuel gas and to avoid explosion conditions.

The analyzer 70 can be a simple burner which burns a small fuel gas flow as an indication of heating value. If the flow goes out, a photocell triggers a trip to separate the gasifier from the plant 10. Alternatively, a sample flow of the fuel gas can be blended with air and passed over a catalyst where it is catalytically oxidized. The temperature rise of the gas is sensed, and if the temperature rise falls below a setpoint, the gasifier is tripped from the plant 10. If faster sensing and control is desired, the fuel gas sample is analyzed spectographically for carbon dioxide and a $CO/CO_2$ ratio controller trips the gasifier if the carbon dioxide level rises too much; alternatively, oxygen can be measured at a point along the gas reaction region where oxygen content normally is diminished substantially to zero value, and if oxygen presence is sensed, a gasifier trip is generated.

Other SGP controls include flow controls for the evaporator drum 48. Thus, a three mode drum level controller 72 operates a hot HRSG feedwater valve 74 in response to outputs from an evaporator drum level sensor 76 and steam and water flow sensors 78 and 80.

A gasifier boiler economizer value 82 is operated by a temperature error controller 84 to satisfy a temperature setpoint for the gas leaving the economizer portion of the gasifier boiler. A sensor 86 provides a signal representing the temperature of the fuel gas leaving the economizer portion of the gasifier boiler and it is compared to the setpoint in generating the fuel gas temperature error signal. However, flow is not allowed to be reduced to less than that required to cool the fuel gas passing through the economizer 33.

Control is provided for the heating of the fuel gas in the heater 32 by a valve 88 which is operated by a temperature error controller 90 and located on the outlet side of the heater to prevent flashing at the outlet of the valve 88. Preferably, the controller 90 compares a signal from a fuel gas temperature sensor 92, located on the gas outlet side of the heater 32, with a signal from a water temperature sensor 94 located on the water inlet side of the heater 32. The controller 90 operates the valve 88 to hold the fuel gas temperature at a setpoint value such as 30° F below the measured water temperature. In this way, the temperature control is kept within an operating range defined by available heat in the water supply.

The booster compressor 20 is driven at constant speed by an electric motor 46, and accordingly is basically operated on a stand alone basis. The air flow to the gasifier 12 is regulated by variable guide vanes on the booster compressor 20. To prevent compressor surge during transients, air is recirculated through the compressor 20 and its associated inlet air cooler. A recirculation valve 98 is preferably operated by a volume flow signal from a flow sensor.

Power consumption by the booster 20 is minimized with lowest inlet temperature to the compressor. The water flow to the air cooler is substantially wide open. A modulating valve sensing water return temperature can be incorporated to conserve water use and circulating pump power if desired.

The gasifier 12 operates with the maximum air flow the booster compressor can deliver. Pressure follows the booster compressor pressure flow characteristic. If the gas turbine set 14 is at low load, gas turbine combustor pressure is low. Air flow to the gasifier 12 is also low and booster pressure ratio is high. The two effects cancel out to some extent and fuel gas pressure stays more constant than without these compensating effects. Gasifier pressure remains higher at low load ready to accept a load increase. As already noted, fuel supply to the gasifier 12 is matched to the air supply to maintain the desired fuel to air ratio in the gasifier 12.

Water is supplsied to the deaerator drum 42 from the condenser hotwell by the condensate pump as regulated by the deaerator storage level. Makeup and return to condensate storage is controlled by the hotwell level. Deaerator pressure is maintained by auxiliary trubine exhaust steam or extraction from the main steam turbine 18.

Level is also controlled by the HRSG drum 46 by valves (not shown) in the drum inlet paths. Other valves are used throughout the plant to control various flows but they are not shown because they are not directly related to the invention.

No flow control on the boiler feed pump 44 is provided. The pump pressurizes the economizers to maximum pressure at all times as determined by the pump pressure flow characteristic. A normal boiler feed pump bypass system is provided to prevent pump overheating. The steam turbine 18 and heat recovery boiler and superheater operate at the pressure produced by the steam flow through the turbine 18. Pressure slides up and down in response to steam flow. The gasifier system 12 operates at constant steam pressure, i.e. steam pressure in the gasifier drum 48 is held constant by a pressure relief valve in the main steam line.

Steam is produced in the drums 46 and 48 as a function of the temperatures of the generated fuel gas and the gas turbine exhaust. Both quantities are functions of gas turbine load, and steam production and steam turbine power thus follow gas turbine load as in combined cycles with unfired boilers.

Steam flowing to the superheater is the balance of production after process heat requirements have been met. Steam temperature to the steam turbine 18 is prevented from exceeding the turbine limit by a bypass across the cold end of the superheater.

The steam turbine throttle valve is normally wide open. During startup, at light loads and during upsets, the steam throttle valve may close. At these times steam is relieved to the condenser 36 through a relief valve and a simple water flood desuperheater with no temperature control. During startup and synchronization of the steam turbine 18, the relief valve is transferred to a lower pressure setpoint to provide better control of steam turbine speed.

Pressure in the steam drum 52 is maintained by regulation of the auxiliary steam turbine exhaust or main steam turbine extraction. Excess pressure is relieved to the drum 42. Excess water from the drum 52 overflows to the drum 42.

The gasification system 12 is maintained in a hot standby condition by combustion of No. 2 oil in the gasifiers with an excess of air. Effluent from the gasifiers on standby is not combustible or polluting and is vented upstream of the gas cleanup system.

The booster compressor 20 is used for standby operation entraining atmospheric air through a check valve. Standy compressor flow and power require about 10% of full load. In addition to the gasifier 12, the boiler feed pump and the deaerator are maintained in operation during standby. If the deareator requires heat in addition to the hot drains, a valve allows additional water to flow from the drum 52 in tresponse to a signal of low pressure from the deaerator.

The gas turbine set 14 is started, synchronized and brought to about 10% load using No. 2 oil. When the gas turbine set 14 has been brought to synchronized steady state, the booster compressor 20 and the gasifier 12 are brought up to normal operating pressures by introducing gas turbine compressor discharge air to the booster compressor 20. The pressure in the clean fuel gas line increases as the gasifiers become charged. The rate of increase of pressure is limited to the setting of the extraction air flow limiter. When the pressure in the fuel gas line is sufficiently high, the fuel control switches to gas, and operation then transfers to gas supplemented by oil as necessary. While the gas turbine 14 and gasifier system 12 are being brought on the line, steam production from both sources progressively increases.

Steam is partially vented to the condenser 36 at the low pressure setting of the relief valve while the steam turbine 18 is being heated to operating temperature. Steam temperature can be reduced if desired by the superheater bypass. When the steam turbine 18 has been synchronized, the relief valve setting is ramped to full pressure applying load to the steam turbine generator. The turbine throttle valve is opened wide as steam conditions and load requirements dictate.

As already indicated, steam production in both the gasififer system 12 and the heat recovery boiler 16 is a function of load. As the gasifier output of fuel gas increases, so does the output of steam and steam turbine power.

The gasification process can be isolated from the power plant section and the power plant section then operates on an alternate fuel. in this case, the alternate fuel is distillate oil. The dual fuel system of the gas turbine set 14 can operate the gas turbine set 14 to full load on distillate. In this mode, the plant 10 is a combined cycle with an unfired heat recovery boiler. Because of the reduced steam production from only the heat recovery boiler, the superheater and the economizer are both oversized for this mode of operation. The superheater bypass is substantially open to prevent excessive temperature of the steam flowing into the steam turbine 18. Steam flow and boiler pressure are about 50% of design and the feedwater flow control valve at outlet from the economizer maintains about 1400 psia in the economizer. Boiler approach temperature is 100° F or less and gas temperature in the economizer is thus less than saturation temperature in the economizer. Steam accordingly does not form in the economizer. Flashing to steam does occur at the outlet of the feedwater flow control valve.

On load transients, gas turbine combustor pressure varies with gas turbine air flow and firing temperature. Fuel gas pressure varies in line with the combustor pressure. No rapid change in fuel gas pressure occurs because of the damping effect produced by the relatively large gasifier volume. Thus, the fuel control system responds faster than any change in fuel gas pressure.

If the plant 10 has been operating at low output, the gas turbine fuel control system is on load control. A demand for increased load opens the gas fuel valve. If the required output cannot be satisfied by the gas fuel, the liquid fuel valve opens to supplement the gas fuel. When at low output, combustor pressure is low but the low requirement of air for the gasifier 12 results in a higher pressure ratio of the booster compressor 20. This natural characteristic tends to maintain pressure in the gasifier 12 when gas turbine power output and combustor pressure are low and also prevents excessive buildup of gasifier pressure when load and combustor pressure are high. If fuel gas supply is not supplemented by oil, the rate of increase of load is limited to the rate at which gasifier and fuel gas pressure can increase.

A sudden drop of gas turbine load results in gasifier pressure exceeding combustor pressure by a wider than normal margin. The pressure flow characteristic of the booster compressor 20 reduces flow until gasifier pressure has decayed. If flow decays to the point that compressor surge is imminent, the inlet guide vanes on the compressor 20 close automatically and the recirculation valve 98 opens to maintain flow above the surge level. The booster compressor 20 can continue to run in the recirculation mode without detriment until pressures have stabilized at the equilibrium conditions for the new load.

What is claimed is:

1. An electric power plant having a steam turbine and a gasifier system, said plant comprising at least one gas turbine set and at least one heat recovery steam generator which receives hot gas turbine exhaust gas to produce steam for operating the steam turbine, means for supplying a fossil fuel to said gasifier system, means for supplying compressed air from said gas turbine set to said gasifier system, means for controlling the flow of gasifier input fossil fuel as a function of a signal which is dependent on the variation in air flow to the gasifier system as plant load changes occur, means for cooling and cleaning generated fuel gas, and means for reheating the generated fuel gas for use in said gas turbine set.

2. A plant as set forth in claim 1 wherein said controlling means includes means for sensing the input fuel and compressed air flows and for generating a fuel flow control signal which varies the input fossil fuel flow to hold a setpoint ratio between the input fossil fuel and compressed air flows.

3. A plant as set forth in claim 2 wherein means are provided for sensing the makeup of the fuel gas and for varying a signal which establishes the flow ratio setpoint to maintain desired fuel gas heating value.

4. A plant as set forth in claim 1 wherein said reheating means includes a heater through which the fuel gas is passed, means for supplying hot water to said fuel gas heater from the low temperature end of said heat recovery steam generator so as to heat said fuel gas, and means for controlling the flow of said hot water to said heater as a function of the fuel gas temperature on the heater exit side and the hot water temperature on the heater entry side.

5. An electric power plant having a steam turbine and a gasifier system, said plant comprising at least one gas turbine set and at least one heat recovery steam generator which receives hot gas turbine exhaust gas to produce steam for operating the steam turbine, means for supplying a fossil fuel to said gasifier system, means for supplying compressed air from said gas turbine set to said gasifier system, means for controlling the ratio of gasifier fossil fuel input flow and gasifier air flow to a setpoint value, means for cooling and cleaning generated fuel gas, means for reheating the generated fuel gas for use in said gas turbine, said reheating means includes a heater through which the fuel gas is passed, means for supplying hot water to said fuel gas heater from the low temperature end of said heat recovery steam generator so as to heat said fuel gas, and means for controlling the flow of said hot water flow to said heater as a function of the fuel gas temperature on the heater exit side and the hot water temperature on the heater entry side.

* * * * *